UNITED STATES PATENT OFFICE.

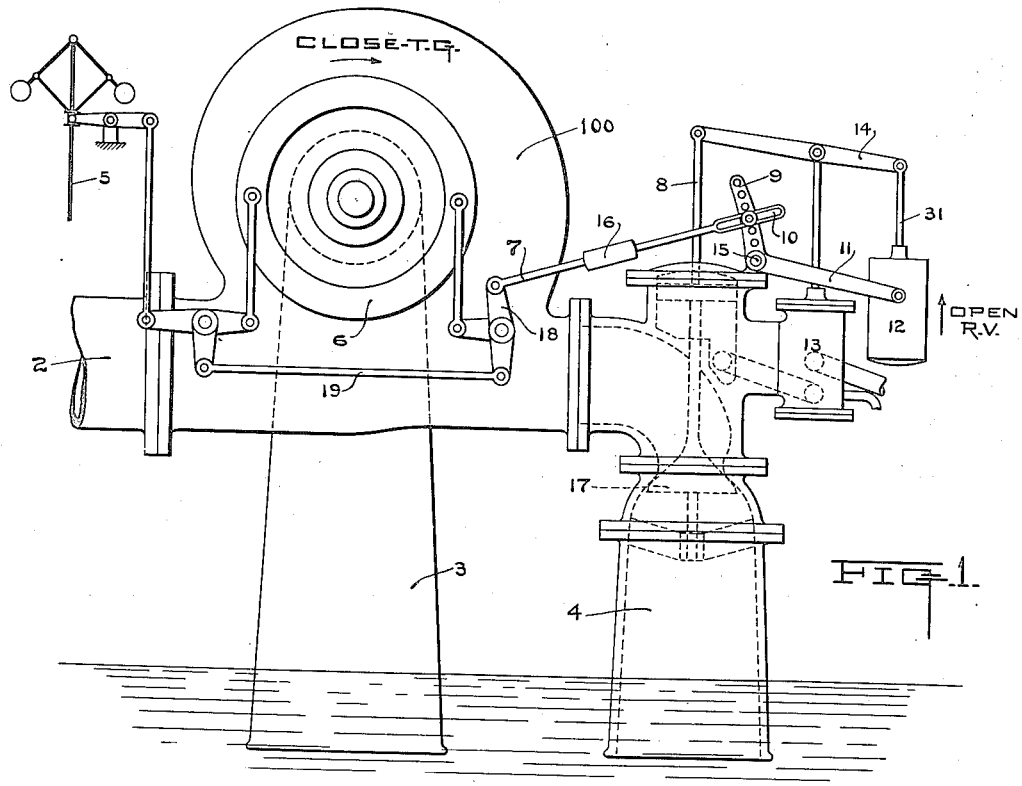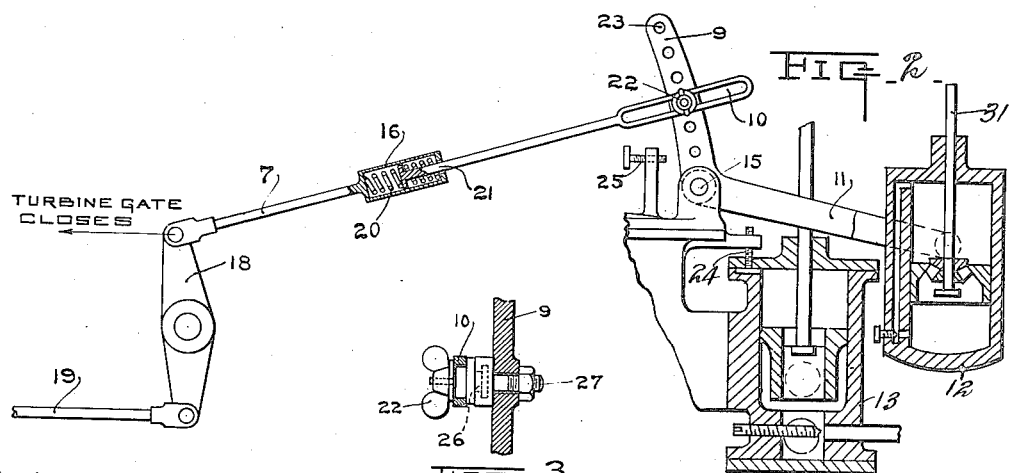

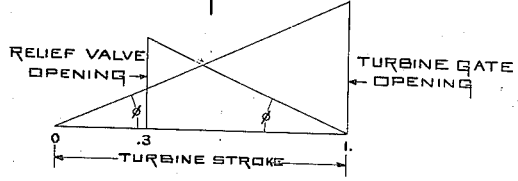
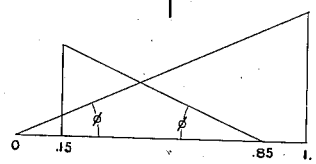
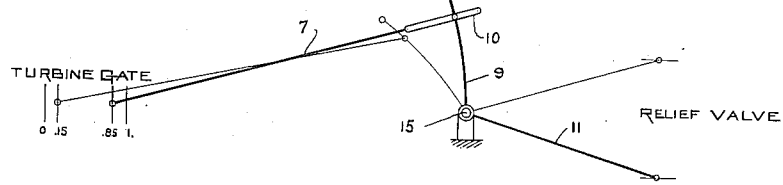
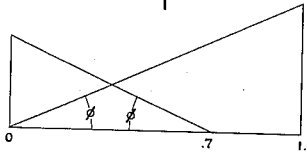
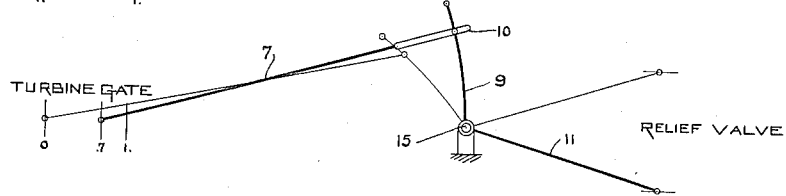

ARNOLD PFAU, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

RELIEF MECHANISM FOR HYDRAULIC TURBINES.

1,167,714.  Specification of Letters Patent.  Patented Jan. 11, 1916.

Application filed December 26, 1912. Serial No. 738,756.

*To all whom it may concern:*

Be it known that I, ARNOLD PFAU, a citizen of the Republic of Switzerland, residing at Milwaukee, in the county of Milwaukee and State of Wisconsin, have invented a certain new and useful Improvement in Relief Mechanism for Hydraulic Turbines, of which the following is a specification.

This invention relates to relief mechanism for hydraulic turbines and the object thereof is to make possible the use of a pressure regulator or relief valve of smaller discharge capacity than that of the turbine as defined by the gate opening, with such means for adjustment that the rate of change of discharge of the pressure regulator or relief valve may be varied so that it may be made equal to the rate of change of discharge of the turbine gate.

A further object of the invention is to provide means for predetermining the timing of the stroke of the relief valve with respect to the stroke of the gate; or in other words, to provide means whereby the relief valve stroke, which is less than that of the gate when the rates of change of opening or discharge are the same, may be applied to correspond to a predetermined part of the gate stroke, or even where the stroke of relief valve may be completed after the closing or opening of the gate.

Some of the novel features of construction shown and described form no part of the present invention, being claimed in application Serial No. 515,890, filed Sept. 2, 1909.

Referring to the accompanying drawing, Figure 1 is a side elevation of the invention as applied to a hydraulic turbine. Fig. 2 is a side elevation, partly in section, of the linkage connecting the turbine gate and the relief valve. Fig. 3 is a sectional view of the detail connecting the slotted link and the bell crank lever of the aforesaid linkage. Figs. 4, 5 and 6 are diagrammatic views of the linkage in different adjusted relations; and Figs. 7, 8 and 9 are diagrammatic views indicating the relative condition as to size of the thoroughfare through the gate and of the thoroughfare through the relief valve and also indicating the timing of the strokes thereof.

By "rate of change of discharge" as used in this specification and claims, is meant the volumetric increase or decrease in the quantity of fluid discharged per unit of time.
By "rate of discharge" is meant the actual volume of fluid discharged per unit of time. The rate of change would therefore be the difference in rates of discharge prevailing at the beginning and the end of a unit of time.

Referring to the drawings, and especially to Fig. 1, the pipe line 2 is shown communicating with a Francis turbine 100, having gate mechanism 6 comprising a circularly arranged set of movable guide vanes as is usual in this type of turbine. As there is no particular feature of the gate mechanism that is novel in presenting this invention, it is not shown in detail and it will be understood that the gate mechanism 6 is operated circumferentially in a clockwise direction as viewed in Fig. 1 to close the gates, and circumferentially in the opposite direction to open the gates. This gate mechanism 6 is herein generally referred to as the turbine gate. A speed governor 5, operated by the turbine, is diagrammatically shown as directly operating the turbine gate, but it will be understood that it is usual to have a relay mechanism interposed when necessary. The links connecting directly with the gate mechanism 6 are interconnected by means of bell cranks and connecting rod 19. Bell crank lever 18 further connects through the rod 7 with a main bell crank lever mounted on shaft 15, the arm 9 thereof connecting directly with rod 7. The arm 11 of the main bell crank lever connects with the casing of the dash pot 12. The dash pot piston rod 31 connects with a floating lever 14, an intermediate point of which lever connects with the upper end of the stem of a valve within the casing 13, and the opposite end of which lever connects with the rod 8 of the relief valve 17 located in the discharge passage 4 of the turbine. The regular discharge of the relief valve 17 is through the draft tube 3. The relief valve rod 8 has an operating piston secured thereto which is reciprocable within a cylinder formed in the upper portion of the casing of the valve 17. The lower piston chamber connects with the casing of the valve 13 at a point below the valve seat. The casing of the valve 13 connects with exhaust at a point above the valve seat. A needle controlled conduit connects the lower portion of the casing of the valve 13 with the pen stock 2. When the valve 13 is down against its seat, fluid under pressure is admitted directly from the pen stock 2 to the lower piston chamber of the valve 17, tending to close this valve. When the valve 13 is away from its seat, the lower piston chamber of the valve 17 is placed in communication with the exhaust. If the valve 13 is open to a considerable extent so that the escape of fluid through the exhaust is more rapid than the admission of fluid past the needle valve, the pressure in the lower operating piston chamber of the valve 17 will drop and the penstock pressure above the valve 17 tends to open the same.

Referring more particularly to Fig. 2 of the drawing, rod 7 is indicated as in sections, the relief valve section 21 thereof having a slot 10 formed therein for connection to the arm 9 of the main bell crank lever. The section 21 is connected to the rod 7 by means of springs 20 located within spring casing 16 on opposite sides of the enlarged end of the section 21. The arm 9 is formed with spaced bores 23 for adjustable connection to rod 7. This arm 9 is preferably curved upon a radius the center of which is at the point of connection of the rod 7 to bell crank lever 18. Stops 25, 24, are provided for the main bell crank lever.

Referring more particularly to Fig. 3, connection between the rod 7 and arm 9 is indicated as comprising a bolt 27 rigidly connected to the arm 9 and having a recessed head within which is swiveled the head of a bolt 26, having an intermediate shoulder against which is fitted the slotted end of rod 7. A wing nut 22 screws upon bolt 26 to firmly clamp the rod 7 to the intermediate shoulder of bolt 26. The general operation of the turbine and relief valve, it should be understood, is old and well known, but it will briefly be described here. The slowing down of the turbine due to an increase in load will cause the collar of governor 5 to drop. This will, through its connections, cause link 19 to move to the left, as shown in Fig. 1, and the gate mechanism 6 to be rotated counter-clockwise to open the turbine gate wider. This opening of the turbine gate will permit increased flow to the turbine, thus taking care of the increase of load. At the same time rod 7 will move to the right, thus depressing the right end of arm 11 of the main bell crank lever. If the movement of the rod 7 toward the right is sudden, the fluid in the dash pot 12 does not have sufficient time to pass from the upper to the lower side of the piston through the holes therein, and the rod 31 is moved downward causing the valve 13 to close and to permit the penstock pressure to build up below the actuating piston of the valve 17 to close this valve. If the movement of the rod 7 toward the right is slow, the fluid within the dash pot 12 merely passes through the relatively large dash pot piston opening and the by-pass conduit in the dash pot casing, without affecting the valves 13, 17. Upon a falling off of the load, the governor 5 will by its increased speed raise its collar to cause link 19 to move to the right and also to cause the turbine gate to move toward closing position. Motion of the link 19 toward the right causes the rod 7 to move toward the left. If this motion is sudden, the bell crank 11 will suddenly raise the casing of the dash pot 12, causing the dash pot piston to move with the casing and to engage the disk secured to the stem 31 above the piston, this engagement of the piston and disk cutting off communication between the upper and lower piston chambers through the piston and causing the rod 31 to move upwardly. Upward motion of the rod 31 opens the valve 13, relieving the pressure below the actuating piston of the valve 17 and permitting the penstock pressure to open the valve 17. This opening of the valve 17 prevents shocks within the pipe line 2 which might otherwise be caused by manipulation of the turbine gates. If the motion of the rod 7 toward the left is very slow, the fluid within the dash pot 12 merely by-passes the dash pot piston through the piston openings and the by-pass conduit in the dash pot casing, without affecting the valves 13, 17.

Referring to Figs. 4, 5 and 6, it will be seen that various adjustments of the connections between the turbine gate and the relief valve are possible to correspond to the showing in Figs. 7, 8 and 9 of operation of the turbine gate and the relief valve respectively. In Fig. 4 the connection between rod 7 and arm 9 of the main bell crank lever is such that when the turbine gate is wide open the relief valve is closed, and when the turbine gate is .3 open, the relief valve is wide open. Fig. 5 shows the connection between rod 7 and arm 9 such that when the turbine gate is .85 open, the relief valve is closed, while when the turbine is .15 open, the relief valve is wide open. This is brought about by increasing the effective length of rod 7. In Fig. 6 the connection between rod 7 and arm 9 is such that when the turbine gate is .7 open, the relief valve is closed, and when the turbine gate is closed, the relief valve is wide open.

By shifting the connection of the rod 7 along the arm 9 so as to be at a different distance from the axis of shaft 15 of the main bell crank lever, the stroke of the relief valve may be changed. This, of course, will alter the rate of discharge through the said relief valve, and will consequently permit alteration of the rate of change of discharge therethrough corresponding to various positions of the gate. By shifting this connection of the rod 7 along the arm 9, the rate of change of discharge past the relief valve may therefore be made to agree with the rate of change of discharge past the turbine gate. Or in other words, the rates φ of change of the size of thoroughfare past the relief valve and past the turbine gate during the strokes of the valve and gate can be made equal to each other. This will, therefore, provide ideal conditions of regulation of the stroke of the smaller capacity relief valve, this valve opening an amount equal to any closing of the turbine gate. The conditions under which it is desirable to use such a smaller capacity relief valve are where it can be relied upon to have a load which is known will make rapid changes between different limits. For instance, in the case of Fig. 7 where these changes take place between .3 full load and full load; or in case of Fig. 8, where these changes take place between .15 and .85 full load; or in the case of Fig. 9 between no load and .7 full load.

It should be noted that the means for permitting adjustment of the stroke of the relief valve 17 by changing the position of the bolt 27 along the arm 9, is operable independently of the means for varying the time of opening thereof by adjusting the connection between the slotted end 10 of the rod 7 and the bolt 26. This feature permits actuation of one of these means without affecting the other. It should also be noted that it is essential only to have relative variation in the rates of discharge through the relief valve 17 and through the turbine gate 6, and also that the change in timing of the strokes of the relief valve and of the gate need only be relative.

The stop 24 will come into use in such cases as are illustrated by Figs. 8 and 9, where the relief valve opening is delayed after the turbine gate begins to close. The connections are such that rod 7 moves to the left, relieving the tension of springs 20 and not moving the section 21 of rod 7 and the main bell crank lever until it is desired to have the relief valve begin to open. This in the case of Fig. 8 is at .85 full load position of the turbine gate, and in case of Fig. 9 at .7 full load opening of the turbine gate. In the same way stop 25 comes into use where the relief valve is fully open before the turbine gate is fully closed, as in the conditions illustrated in Figs. 7 and 8, where the springs 20 will be compressed after the relief valve reaches full open position and the turbine gate continues to move toward closing position. This will commence in the case of Fig. 7 at .3 full load turbine gate opening and in case of Fig. 8 at .15 full load turbine gate opening. The stops 24 and 25 therefore relieve the servo-motor valve and connections of any strain that might otherwise be brought upon them by the motion of the turbine gate. This will cease at the main bell crank lever by being taken up by the springs 20.

It should be understood that it is not desired to be limited to the exact details of construction shown and described, for obvious modifications will occur to a person skilled in the art.

It is claimed and desired to secure by Letters Patent,—

1. In a hydraulic turbine, a gate, a relief valve of smaller capacity than said gate, operating means for said gate, means for relatively varying the rates of discharge through said relief valve and through said gate whereby for like periods of time any change in discharge through said relief valve will be inverse and equal to a corresponding change in discharge through said gate, and means operable independently of said varying means for relatively changing the timing of the strokes of said relief valve and of said gate.

2. In a hydraulic turbine, a gate, a relief valve of smaller capacity than said gate, operating means for said gate, means for varying the rate of discharge through said relief valve whereby for like periods of time any change in discharge through said relief valve will be inverse and equal to a corresponding change in discharge through said gate, and means operable independently of said varying means for changing the timing of the stroke of said relief valve with respect to the stroke of said gate.

3. In a hydraulic turbine, a gate, a relief valve of smaller capacity than said gate, means for inversely operating said gate and said relief valve, adjustable means for maintaining the same rate of change of discharge through said gate and through said relief valve, and means for varying the timing of the stroke of said relief valve with respect to the stroke of said gate, said adjustable means and said varying means being independently operable.

In testimony whereof, the signature of the inventor is affixed hereto in the presence of two witnesses.

ARNOLD PFAU.

Witnesses:
  W. H. LIEBER,
  G. F. DE WEIN.